(12) United States Patent
Wu et al.

(10) Patent No.: US 11,584,670 B2
(45) Date of Patent: Feb. 21, 2023

(54) BIO-TRICKLING FILTER BOX DEVICE CAPABLE OF PURIFYING ORGANIC WASTEWATER AND GENERATING ELECTRICITY

(71) Applicant: Sanming University, Sanming (CN)

(72) Inventors: Chih-Hung Wu, Sanming (CN); Xiang Wang, Sanming (CN); Jer-Yuan Shih, Sanming (CN); Ching-Hua Liao, Sanming (CN); Hongduo Li, Sanming (CN); Bin Ouyang, Sanming (CN); Zhigang Wu, Sanming (CN); Lingwei Yang, Sanming (CN); Tingliang Liu, Sanming (CN)

(73) Assignee: Sanming University, Sanming (CN)

( * ) Notice: Subject to any disclaimer, the term of this patent is extended or adjusted under 35 U.S.C. 154(b) by 0 days.

(21) Appl. No.: 17/391,763

(22) Filed: Aug. 2, 2021

(65) Prior Publication Data
US 2022/0064035 A1 Mar. 3, 2022

(30) Foreign Application Priority Data

Sep. 3, 2020 (CN) .......................... 202010914270.9

(51) Int. Cl.
*C02F 3/00* (2006.01)
*C02F 3/04* (2006.01)
(Continued)

(52) U.S. Cl.
CPC ................ *C02F 3/005* (2013.01); *C02F 3/04* (2013.01); *H01M 8/16* (2013.01); *C02F 2101/30* (2013.01)

(58) Field of Classification Search
CPC ........ C02F 3/005; C02F 3/04; C02F 2101/30; C02F 2303/10; C02F 3/34; H01M 8/16; Y02W 10/10; Y02W 10/30; Y02E 60/50
(Continued)

(56) References Cited

U.S. PATENT DOCUMENTS 4,119,273 A * 10/1978 Armstrong ............. B01D 21/24
239/254
2013/0143140 A1 * 6/2013 Yoon .................... H01M 8/0252
429/535
(Continued)

FOREIGN PATENT DOCUMENTS

CN 101607781 B * 5/2011 ............. C02F 11/00
CN 103999814 A * 8/2014 ............. A01K 63/00
(Continued)

OTHER PUBLICATIONS

Insulation_definition_oxford.pdf (Year: 2022).*
WO_2011074892_A2_M.pdf (Year: 2012).*

*Primary Examiner* — Nam X Nguyen
*Assistant Examiner* — Ekandra S. Miller-Cruz
(74) *Attorney, Agent, or Firm* — M&B IP Analysts, LLC

(57) ABSTRACT

A bio-trickling filter box device capable of purifying organic wastewater and generating electricity is provided, which includes battery component(s) and a bio-trickling filter box component. The battery component(s) is provided in the bio-trickling filter box. The other end of each of trickling filter tube(s) is connected with a water tank. A water pump operates to make water flow through the trickling filter tube(s), pass through leakage holes and trickling holes, and drip into the battery component(s) in a water-drop manner, so as to supply an electric apparatus component with power. The bio-trickling filter box component(s) and the battery component(s) are combined, and the long-term impingement of water droplets on the battery component(s) can accumu-
(Continued)

late electric charge and generate the electricity. so as to provide power required by the electric apparatus component, which forms a biological treatment system that generates the power while treating the wastewater.

9 Claims, 5 Drawing Sheets

(51) Int. Cl.
  *H01M 8/16* (2006.01)
  *C02F 101/30* (2006.01)
(58) Field of Classification Search
  USPC .......................................................... 210/150
  See application file for complete search history.

(56) References Cited

U.S. PATENT DOCUMENTS

2016/0351936 A1* 12/2016 Cooke ...................... C12N 1/20
2020/0002200 A1* 1/2020 Bretschger .............. H01M 8/16

FOREIGN PATENT DOCUMENTS

| CN | 105958083 A | * | 9/2016 | ............. H01M 4/86 |
| CN | 109499352 A | * | 3/2019 | ............. B01D 53/44 |
| TW | M-529283 U | * | 9/2016 | ............. Y02E 60/50 |

* cited by examiner

BIO-TRICKLING FILTER BOX DEVICE CAPABLE OF PURIFYING ORGANIC WASTEWATER AND GENERATING ELECTRICITY

CROSS REFERENCE TO RELATED APPLICATION

This patent application claims the benefit and priority of Chinese Patent Application No. 202010914270.9 filed on Sep. 3, 2020, the disclosure of which is incorporated by reference herein in its entirety as part of the present application.

TECHNICAL FIELD

The disclosure relates to the technical field of microbial fuel cells, and in particular to a bio-trickling filter box device capable of purifying organic wastewater and generating electricity.

BACKGROUND ART

A process of the bio-trickling filter tank belongs to a bio-membrane process in a sewage biological treatment. The advantages of the process of the bio-tricking filter tank include a small footprint for easy operation and management, a low sludge generation, no sludge bulking, as well as a higher sludge age and a relatively stable biological phase. Compared with the ordinary bio-trickling filter tank, a bio-trickling filter tank with multi-layers is easier to disassemble and replace filler, and conducive to uniformly distributing the water.

Microbial fuel cells are a kind of energy converter that can directly convert the organic matter into electric energy. The microbial fuel cells may be used in the sewage treatment to achieve the dual effects of wastewater treatment and electric energy regeneration. In recent years, with the deepening of research in this field, the microbial fuel cells with air cathodes have gradually become the mainstay. Because the endless supply of oxygen in the atmosphere has high redox characteristics. And thus, the oxygen is suitable as the most common electron acceptor for cathodes. However, the existing microbial fuel cells with air cathodes mostly use Nafion material as a proton membrane. Accordingly, the disadvantage of the existing microbial fuel cells is that the cost is too high, which limits the range of use to be wide.

SUMMARY

The disclosure discloses a bio-trickling filter box device that can purify organic wastewater and generate electricity. After two biological treatment systems that are the bio-trickling filter tank and the microbial fuel cells are integrated together, not only the organic wastewater is treatable, but also the electricity is able to be generated, which achieves dual purposes of waste reduction and new energy regeneration.

The following technical solutions are provided.

A bio-trickling filter box device capable of purifying organic wastewater and generating electricity, which includes a bio-trickling filter box component comprising a support bracket, at least one trickling filter tube, a water pump, a water tank, and at least one bio-trickling filter box fixed on the support bracket, trickling holes being evenly distributed in a middle portion each of the at least one bio-trickling filter box, the water pump being connected to the at least one trickling filter tube, a side wall of an end of each of the at least one trickling filter tube being provided with a plurality of leakage holes, and the at least one trickling filter tube being provided on the at least one bio-trickling filter box; at least one battery component that is an integrated tubular column shape, a top portion of each battery component being provided with an opening, a water-absorbing hydrogel and a conductive, porous ceramic rings being arranged in the battery component, the ceramic rings being provided with a cathode and an anode, conductive wires being wound on the cathode and the anode respectively, the conductive wires penetrating from a middle portion of the ceramic rings and extending to the opening, and the anode and the cathode at two ends of the battery component being connected by the conductive wires and an electric apparatus component being connected therebetween; wherein the battery component is provided in the each of at least one bio-trickling filter box, another end of each trickling filter tube is connected to the water tank, the water pump operates to enable water flow to flow through the trickling filter tube, the water flow passes through the leakage holes and the trickling holes, and drip into the battery component in a water drop manner, so as to supply the electric apparatus component with power.

As an improvement, the battery component is a microbial fuel cell component.

As an improvement, the water-absorbing hydrogel divides the battery component into an upper half and a lower half, the ceramic rings are located in the upper half and the lower half of the battery component, and the upper half is the cathode, and the lower half is the anode.

As an improvement, a coating thickness of the water-absorbing hydrogel is 5 mm to 50 mm.

As an improvement, a heat-shrinkable film insulation material is provided on an outer portion of the conductive wires.

As an improvement, the at least one battery component includes a plurality of battery components, the plurality of battery components are horizontally provided in the at least one bio-trickling filter box, plurality of battery components sequentially connected in a manner that the anode at an end of the two ends of any one of the battery components is connected with the cathode at an end of the two ends of another adjacent battery component, and the anode and the cathode at two of the plurality of battery components which are unconnected are connected by the conductive wires and the electric apparatus component is connected therebetween.

As an improvement, a spacing between every two of the plurality of battery components is greater than 3 mm.

As an improvement, the at least one bio-trickling filter box includes a plurality of bio-trickling filter boxes, the at least one battery component includes a plurality of battery components, and the plurality of bio-trickling filter boxes are fixed on the support bracket in a horizontal or vertical arrangement manner, the plurality of battery components are installed in the plurality of bio-trickling filter boxes, the plurality of battery components are sequentially connected from left to right or from top to bottom, and the anode and the cathode at two of the plurality of battery components which are unconnected are connected by the conductive wires and the electric apparatus component is connected therebetween.

As an improvement, a voltage generated by each of the battery components is between 0.15V and 0.9V, and the battery components are connected in series, in parallel, or in series and parallel, so as to match a rated voltage of the electrical apparatus component.

As an improvement, the other end of the trickling filter tube which is connected to the water tank is provided with a filter head, and the end of the trickling filter tube is provided with a plug.

By adopting the above technical solutions, the present disclosure can achieve the following technical effects.

In the present disclosure, the bio-trickling filter box component(s) and the battery component(s) are combined, and the water flow is used to form water droplets to drip onto the battery component(s), so that microorganisms in the water are adhere to the battery component(s). And the microorganisms of the microbial battery component(s) can decompose organic matter in the water, thereby purifying wastewater. The long-term impingement of the water droplets on the battery component(s) can accumulate the electric charge and generate the electricity. The battery components can be connected in series, in parallel or in series-parallel to amplify their voltage, current or power, so as to provide the power required by the electric apparatus component, which forms a biological treatment system that generates the power while treating the wastewater.

BRIEF DESCRIPTION OF THE DRAWINGS

In order to explain the technical solutions of the embodiments of the present disclosure more clearly, the following will briefly introduce the drawings that need to be used in the embodiments. It should be understood that the following drawings only show certain embodiments of the present disclosure and should not be regarded as a limitation of the scope. For those of ordinary skill in the art, without creative work, other related drawings can be obtained from these drawings.

Figure 1:
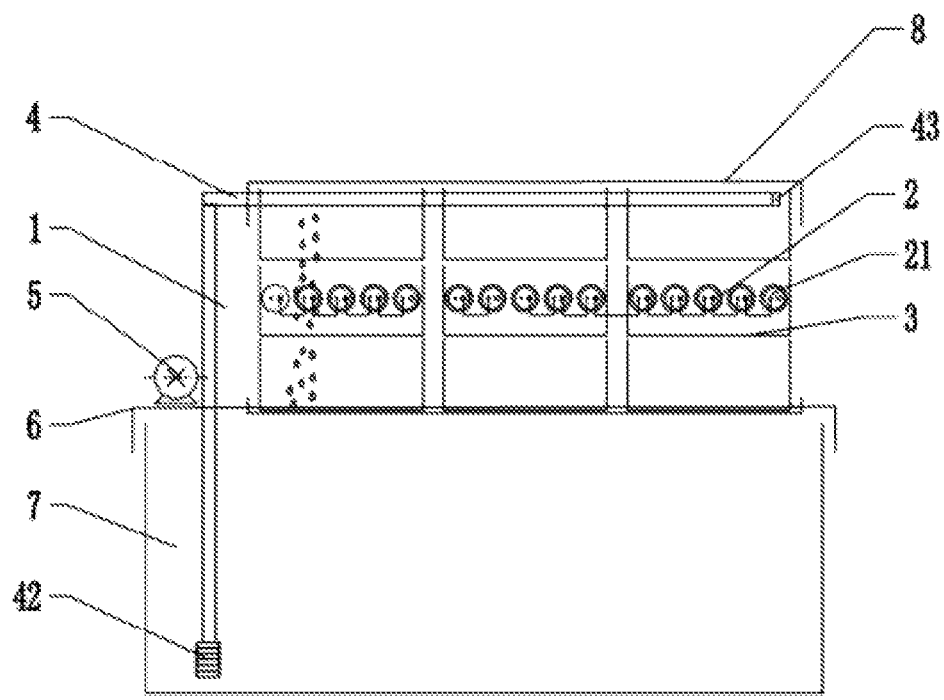
FIG. 1 is a schematic view of a structure according to an embodiment of the present disclosure.

Reference signs: 1 bio-trickling filter box component; 2 battery component; 3 bio-trickling filter box; 4 trickling filter tube; 5 water pump; 6 support bracket; 7 water tank; 8 upper lid; 21 opening; 22 water-absorbing hydrogels; 23 ceramic rings; 24 plastic tube; 25 plastic upper cover; 26 small holes; 27 anodes; 28 cathodes; 31 trickling holes; 41 leakage holes; 42 filter head; 43 plug.

DETAILED DESCRIPTION OF THE EMBODIMENTS

In order to make the objectives, technical solutions, and advantages of the embodiments of the present disclosure clearer, the technical solutions in the embodiments of the present disclosure will be described clearly and completely in conjunction with the accompanying drawings in the embodiments of the present disclosure. Obviously, the described embodiments are a part of the embodiments of the present disclosure, rather than all of the embodiments. Based on the embodiments of the present disclosure, all other embodiments obtained by those of ordinary skill in the art without creative work shall fall within the protection scope of the present disclosure. Therefore, the following detailed description of the embodiments of the present disclosure provided in the accompanying drawings is not intended to limit the claimed scope of the disclosure, but merely represents selected embodiments of the present disclosure. Based on the embodiments of the present disclosure, all other embodiments obtained by those of ordinary skill in the art without creative work shall fall within the protection scope of the present disclosure.

In the description of the present disclosure, it should be understood that the orientations or the positional relationships indicated by terms "center", "longitudinal", "transverse", "length", "width", "thickness", "upper", "lower", "front", "back", "left", "right", "vertical", "horizontal", "top", "bottom", "inner", "outer", "clockwise", "counterclockwise" are based on the orientations or positional relationships shown in the drawings, which are only for the convenience of describing the present disclosure and simplifying the description, and does not indicate or imply that the pointed device or element must have a specific orientation and be constructed and operated in a specific orientation. Therefore, it cannot be understood as a limitation to the present disclosure.

In addition, the terms "first" and "second" are only used for descriptive purposes and cannot be understood as indicating or implying relative importance or implicitly indicating the number of indicated technical features. Thus, the features defined with "first" or "second" may explicitly or implicitly include one or more of these features. In the description of the present disclosure, "a plurality of" means two or more than two, unless otherwise specifically defined.

In the present disclosure, unless otherwise clearly specified and limited, the terms "installed", "coupled", "connected", "fixed" and other terms should be understood in a broad sense. For example, it can be a fixed connection or a detachable connection or integrated together; it can be a mechanical connection or an electric connection; it can be directly connected or indirectly connected through an intermediate medium; and it can be the internal communication of two components or the interaction relationship between two components. For those of ordinary skill in the art, the specific meaning of the above-mentioned terms in the present disclosure can be understood according to specific circumstances.

In the present disclosure, unless otherwise clearly specified and defined, "the first feature is "above" or "below" the second feature" may include the direct contact between the first and second features or may include the first and second features are not in direct contact with each other and contacted through other features therebetween. Moreover, "the first feature is "above", "over" or "on" the second feature" includes the first feature is directly above and obliquely above the second feature, or simply means that the horizontal height of the first feature is higher than that of the second feature. "The first feature is "below", "under" and "beneath" the second feature" includes the first feature directly below and obliquely below the second feature, or simply means that the horizontal height of the first feature is lower than that of the second feature.

EXAMPLE

With reference to FIGS. 1 to 5, a bio-trickling filter box device capable of purifying organic wastewater and generating electricity is provided. The bio-trickling filter box device includes battery component(s) 2 and a bio-trickling filter box component 1. The battery component(s) 2 is connected with an electric apparatus component. The battery component(s) 2 is placed in the bio-trickling filter box component 1, and the battery component(s) 2 can generate electricity after a few days of trickling and filtering the battery component(s) 2 through the bio-trickling filter box component 1, so as to provide power for the electric apparatus component.

The bio-trickling filter box component 1 includes a support bracket 6, trickling filter tube(s) 4, a water pump 5, a water tank 7 and bio-trickling filter box(es) 3. The bio-trickling filter box(es) 3 may be fixed on the support bracket 6. Trickling holes 31 are evenly distributed in a middle portion of the bio-trickling filter box 3, The water pump 5 is connected with the trickling filter tube(s) 4. A side wall of an end of the trickling filter tube is provided with a plurality of leakage holes 41. And the trickling filter tube(s) 4 may be provided on the bio-trickling filter box(es) 3. It is noted that the trickling filter tube(s) 4 may include a single one trickling filter tube or a plurality of trickling filter tubes, depending on a width of the bio-trickling filter box(es) 3, to ensure that the trickling filter tube(s) 4 is over each of the trickling holes 31 of the bio-trickling filter box(es) 3, so as to ensure that the bio-trickling filter box(es) 3 can be uniformly used, thereby preventing no water from passing through partial portions thereof.

The battery component(s) 2 is an integrated tubular column shape, a top portion of the column (i.e., the battery component) is provided with an opening 21. A water-absorbing hydrogel 22 and a conductive, porous ceramic ring 23 are arranged in the battery component(s) 2. The ceramic ring 23 is provided with a cathode 28 and an anode 27. A conductive wire is wound on the cathode 28 and the anode 27. The conductive wire penetrates from a middle portion of the ceramic ring 23 and extends to the opening 21. And the anode 27 and the cathode 28 at two ends of the battery component(s) 2 are connected by the conductive wire and the electric apparatus component is connected therebetween.

Figure 2:
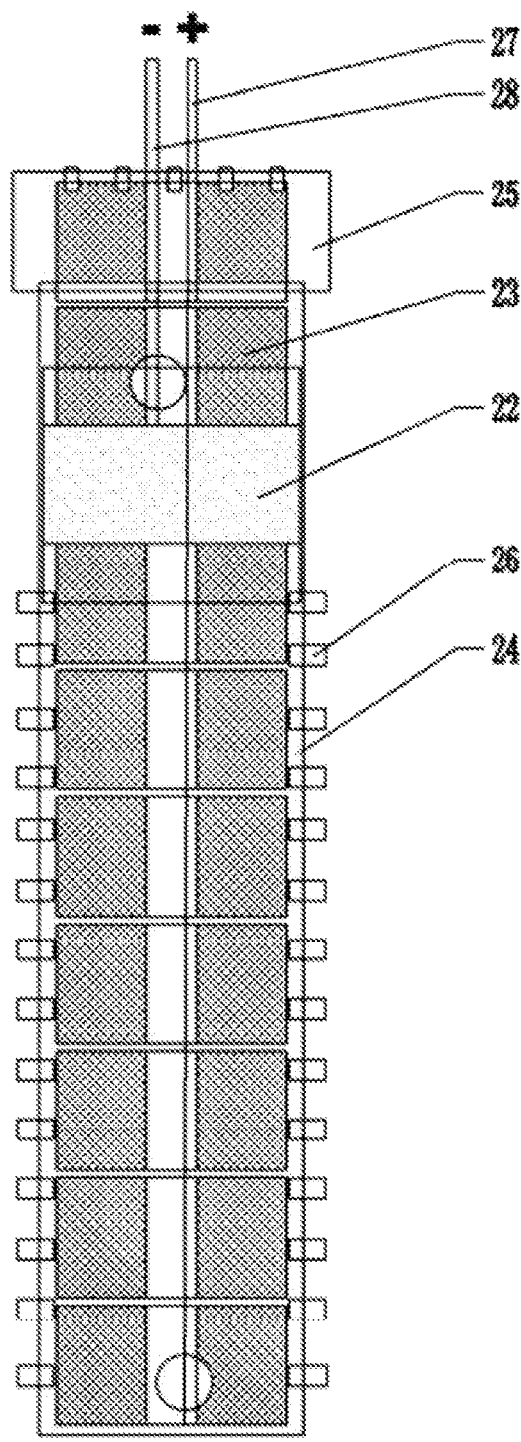
FIG. 2 is a schematic view of a symmetrical cross-sectional structure of a battery component according to an embodiment of the present disclosure.
Figure 3:
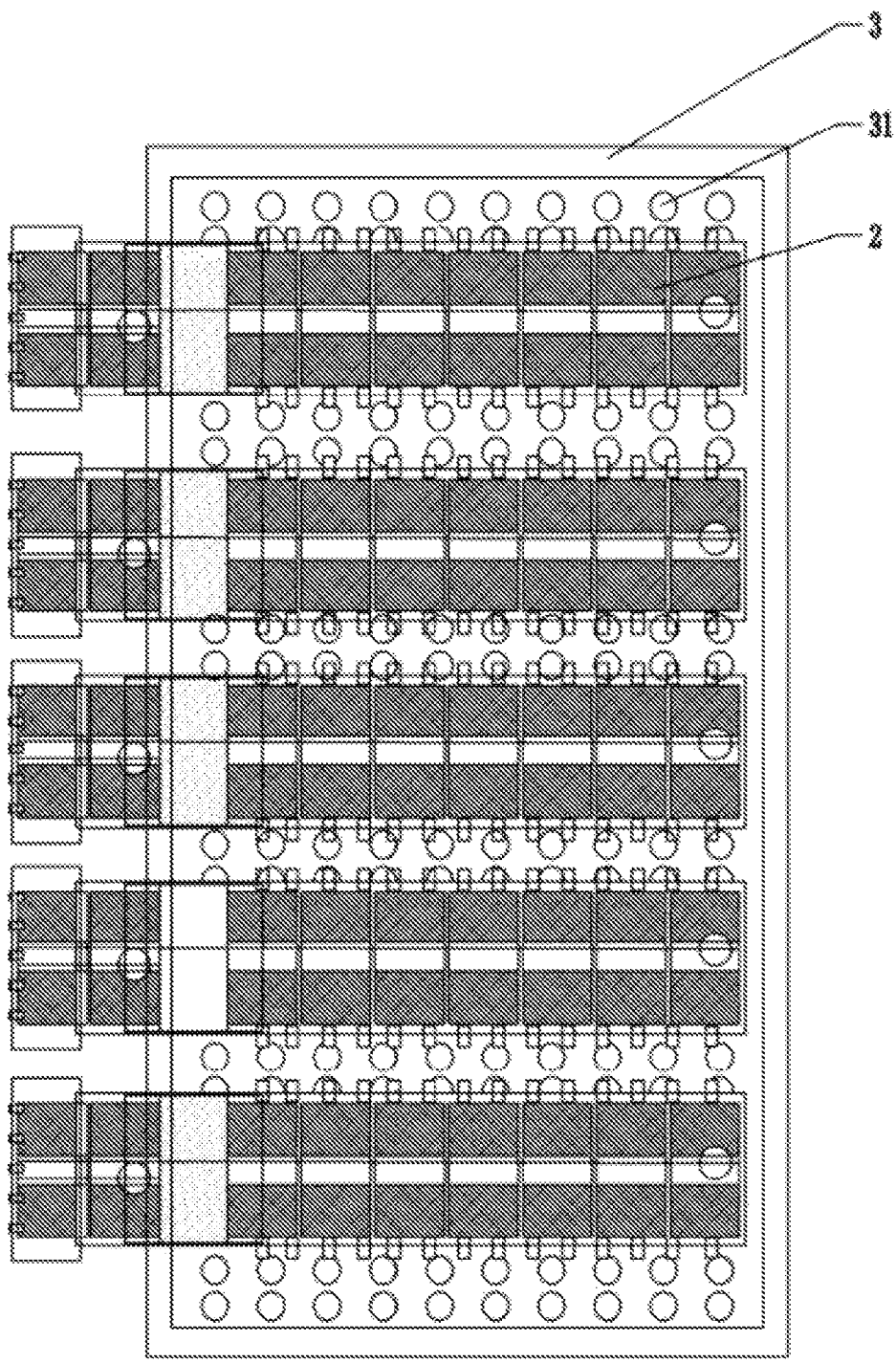
FIG. 3 is a schematic view of a structure of the battery component provided in a bio-trickling filter box according to an embodiment of the present disclosure.
Figure 4:
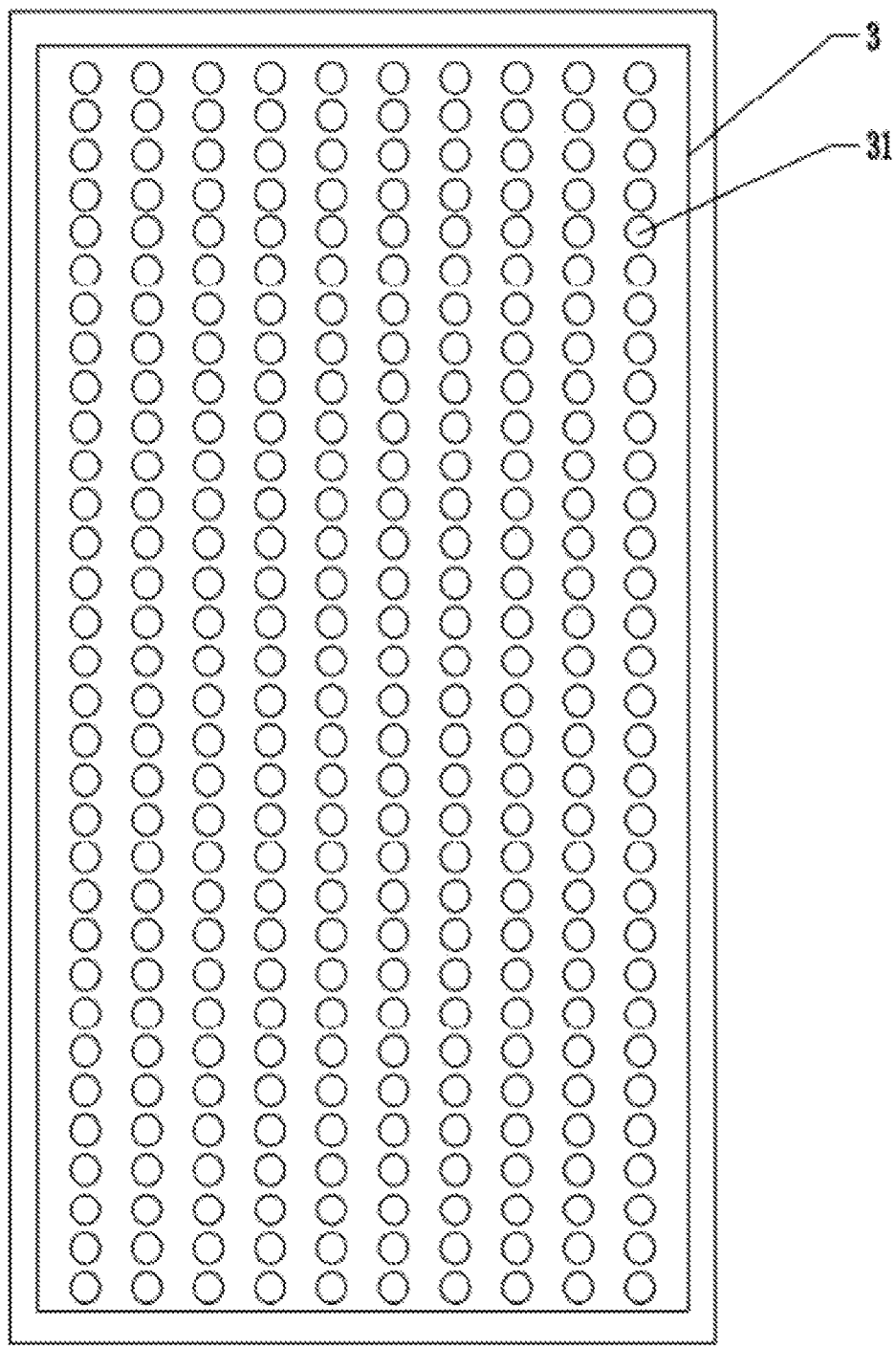
FIG. 4 is a schematic view of a structure of the bio-trickling filter box according to an embodiment of the present disclosure.
Figure 5:
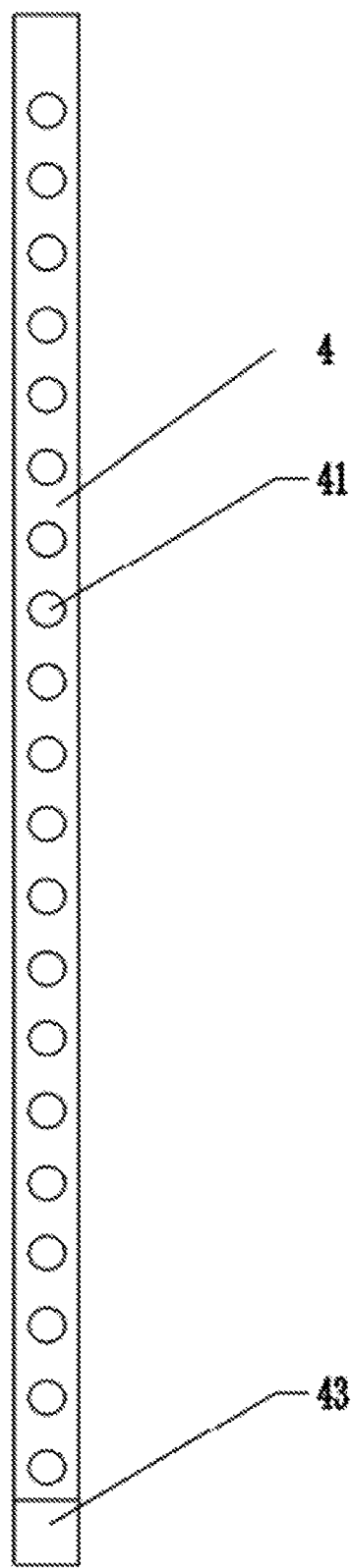
FIG. 5 is a schematic structural view of a trickling filter tube which is provided with a plug at one end according to an embodiment of the present disclosure.

With reference to FIG. 2, the battery component(s) 2 is the integrated tubular column shape, and the top portion of the battery component(s) 2 is provided with a plastic upper lid 25 with screw thread. And the plastic upper lid has a plurality of openings 21. The water-absorbing hydrogel 22 and the conductive, porous ceramic ring 23 are arranged in the cylindrical plastic tube 24 with screw thread. The water-absorbing hydrogel 22 divides the cylindrical plastic tube 24 into an upper half and a lower half. The conductive, porous ceramic ring 23 is located in the upper and lower halves of the tubular column. The upper half is the cathode 28 and the lower half is the anode 27. No openings are in a wall of the upper half of the cylindrical plastic tube 24 with screw thread, and a plurality of small holes 26 is opened in the wall of the lower half of the cylindrical plastic tube 24 with screw thread. In this embodiment, a coating thickness of the water-absorbent hydrogel 22 is 5 mm to 50 mm. Preferably, the coating thickness of the water-absorbent hydrogel 22 is 40 mm. It should be noted that when the thickness of the water-absorbing hydrogel 22 is greater, the upper and lower halves can be better divided, so as to prevent water from coupling the cathode 28 and the anode 27 of the ceramic ring 23, which may cause a short circuit.

Further, the connection manner of the anode and the cathode is that the titanium wire of the corrosion-resistant cathode 28 is wound around the conductive, porous carbide ceramic ring 23 at the upper cathode 28; the conductive, porous carbide ceramic ring 23 at the lower anode 27 is wounded around by the titanium wire of the anode 27; and the titanium wire of the anode 27 and the titanium wire of the cathode 28 respectively penetrate through a middle channel of the conductive, porous carbide ceramic ring 23 and extend to the opening 21 at the top portion of the tubular column. It should be noted that the outer portions of the titanium wire of the anode 27 and the titanium wire of the cathode 28 need to be covered with a heat shrinkable film insulating material to prevent the anode and the cathode from contacting each other and forming a short circuit.

The bio-trickling filter box(es) 3 is provided with multiple battery components 2. And the other end of the trickling filter tube(s) 4 is connected to the water tank 7. The water pump 5 is turned on to pump the water in the water tank 7 into the trickling filter tube(s) 4. The water flows through the leakage holes 41 and then drips downward, so that the water can flow onto the battery components 2 in a drop-like manner. It should be noted that only the lower halves of the battery components 2 are installed in the bio-trickling filter box(es) 3, and the upper halves with the openings 21 thereof are outside the bio-trickling filter box(es) 3, so that the anode 27 and the cathode 28 are prevented from contacting each other and forming a short circuit, as the water can conduct electricity. The water droplets drop on the conductive, porous ceramic rings 23 located in the lower halves of the anode 27, so that microorganisms in the wastewater can adhere to the conductive, porous ceramic rings 23 of the anode 27, and organic matter is supplied which is required for decomposition of the microorganisms. The battery components 2 decompose the organic matter to purify the water, and electrons generated in the decomposition process are accumulated in the conductive, porous ceramic rings 23. The electrons are transferred to the cathode 28 via the titanium wire of the anode 27, and the conductive wire connected with the cathode 28. And the protons in another decomposition process are transferred to the cathode 28 via the water-absorbing hydrogel 22. At this time, the electrons and the protons are in the cathodes 28 and undergo a reduction reaction together with the oxygen in the air, so as to produce the water. The remaining water flows into the water tank 7 through the trickling holes 31 in the bio-trickling filter box(es) 3, and the water in the water tank 7 is continuously pumped to the trickling filter tube(s) 4 through the water pump 5 to form a circulation. The small holes 26 provided on the lower half can allow microorganisms in the wastewater to adhere more to the ceramic ring 23. Through the circulation, not only the wastewater in the water tank 7 can be purified, but also the battery components 2 can be trickled and filtered for a long time, so that the battery components 2 can accumulate electric charge and finally generate the electric energy. It is understandable that, in order to prevent large particles in the wastewater from entering the trickling filter tube(s) 4 to block the leakage holes 41, a filter head 42 is provided on the other end of the trickling filter tube(s) 4 that extends into the water tank 7. And in order to make the water entering the trickling filter tube(s) 4 to pass through the bio-trickling filter box(es) 3 and return back to the water tank 7, a plug 43 is provided on the end of the trickling filter tube(s) 4, so that all water entering the trickling filter tube(s) 4 drips into the bio-trickling filter box(es) 3 through the leakage holes 41, and then flows back to the water tank 7 through the trickling holes 31.

With reference to FIG. 1, a plurality of bio-trickling filter boxes 3 can be placed above the water tank 7. A specific support method is that an outer support bracket is provided around the water tank 7, and then an inner support bracket is fixed on the outer support bracket. The inner support bracket can be divided into one or more layers. The one-layer inner support bracket can place one or more bio-trickling filter boxes 3, so the bio-trickling filter boxes 3 can be fixed horizontally or vertically, or the bio-trickling filter boxes 3 can be placed horizontally and vertically. The plurality of trickling filter tubes 4, depending on the widths of the bio-trickling filter boxes, are installed at the top portions of the bio-trickling filter boxes, and an upper part of the support bracket 6 can also be covered with upper covers 8 of the trickling filter boxes. When multiple battery components 2 are installed in the bio-trickling filter box 3, the anode 27 at an end of the battery component 2 is connected to the cathode 28 at an end of another adjacent battery component 2 sequentially. And the remaining anode 27 and the cathode 28 at two ends that are unconnected are connected by the conductive wire, and electrical apparatus components are connected therebetween. The voltage generated by a single one battery component 2 is between 0.15 V and 0.9 V. The voltage and current of a power generation component can be amplified by connecting multiple battery components 2 in series, in parallel, or in series-parallel, so as to match a rated voltage of the electrical apparatus components, and to turn on the electrical apparatus components. It should be noted that a spacing between every two adjacent battery components 2 is greater than 3 mm, which is also to prevent an identical water droplet from dripping on the two adjacent battery components 2.

It is understandable that when the bio-trickling filter boxes 3 are fixed on the support bracket 6 in a horizontal or vertical manner, the battery components 2 are installed in the bio-trickling filter boxes 3. And the cathode 28 at the end of the battery component 2 is connected with the anode 27 of another adjacent battery component 2 from left to right or from top to bottom sequentially. The remaining anode 27 and the cathode 28, which are unconnected at two ends of the two battery components 2, are connected by the conductive wire, and the electrical apparatus components are connected therebetween. The titanium wires of the anodes 27 and the titanium wires of the cathodes 28 in the microbial fuel cell components 2 of the integrated tubular column shape can be connected in such a manner that microbial fuel cell components 2 of the integrated tubular column shape are connected in series, in parallel or in series-parallel from left to right or from top to bottom; or are connected in series-parallel from up-down and left-down. In this way, the voltage and current of the power generation components can be amplified, and a low-power small electrical appliance can be connected and thus started.

The output voltage of the device will be different based on the difference of the type of organic wastewater and the difference of a circuit connection mode of the microbial fuel cell components 2. According to the voltage, the current, and the power range required by the connected electrical apparatus components, the voltage, the current, or the power thereof is amplified by connecting the fuel cell components in series, in parallel, or in a series-parallel manner.

The above are only the preferred embodiments of the present disclosure, and the protection scope of the present disclosure is not limited to the above-mentioned embodiments. All technical solutions under the idea of the present disclosure belong to the protection scope of the present disclosure.

What is claimed is:

1. A bio-trickling filter box device for purifying organic wastewater and generating electricity, comprising: a bio-trickling filter box component comprising a support bracket, at least one trickling filter tube, a water pump, a water tank, and at least one bio-trickling filter box fixed on the support bracket, trickling holes being evenly distributed in a middle portion of the at least one bio-trickling filter box, the water pump being connected to the at least one trickling filter tube, a side wall of the at least one trickling filter tube being provided with a plurality of leakage holes, and the at least one trickling filter tube being provided on the at least one bio-trickling filter box; and at least one battery component that is an integrated tubular column shape, a top portion of the at least one battery component being provided with an opening, a water-absorbing hydrogel and a conductive, porous ceramic rings being arranged in the battery component, the ceramic rings being provided with a cathode and an anode, conductive wires being wound on the cathode and the anode respectively, the conductive wires penetrating from a middle portion of the ceramic rings and extending to the opening wherein the at least one battery component comprises a plurality of battery components, the plurality of battery components are horizontally provided in the at least one bio-trickling filter box, the plurality of battery components sequentially connected in a manner that the anode at an end of two ends of any one of the plurality of battery components is connected with the cathode at an end of the two ends of another adjacent one of the plurality of battery components, and a remaining anode and a remaining cathode, which are unconnected at the two ends of two battery components of the plurality of battery components, are connected by the conductive wires and an electric apparatus component is connected therebetween: wherein a first end of the at least one trickling filter tube is connected to the water tank, the water pump operates to enable water flow to flow through the trickling filter tube, the water flow passes through the leakage holes and the trickling holes, and drip into the plurality of battery components in a water drop manner, so as to supply the electric apparatus component with power.

2. The bio-trickling filter box device according to claim 1, wherein the battery component is a microbial fuel cell component.

3. The bio-trickling filter box device according to claim 1, wherein the water-absorbing hydrogel divides the battery component into an upper half and a lower half, the ceramic rings are located in the upper half and the lower half of the battery component, and the upper half is the cathode, and the lower half is the anode.

4. The bio-trickling filter box device according to claim 3, wherein a coating thickness of the water-absorbing hydrogel is 5 mm to 50 mm.

5. The bio-trickling filter box device according to claim 1, wherein a heat-shrinkable film insulation material is provided on an outer portion of the conductive wires.

6. The bio-trickling filter box device according to claim 1, wherein a spacing between every two of the plurality of battery components is greater than 3 mm.

7. The bio-trickling filter box device according to claim 1, wherein the at least one bio-trickling filter box comprises a plurality of bio-trickling filter boxes, and the plurality of bio-trickling filter boxes are fixed on the support bracket in a horizontal or vertical arrangement manner, the plurality of battery components are installed in the plurality of bio-trickling filter boxes, the plurality of battery components are sequentially connected from left to right or from top to bottom.

8. The bio-trickling filter box device according to claim 7, wherein a voltage generated by each of the battery components is between 0.15V and 0.9V, and the battery components are connected in series, in parallel, or in series and parallel, so as to match a rated voltage of the electrical apparatus component.

9. The bio-trickling filter box device according to claim 1, wherein the first end of the trickling filter tube which is connected to the water tank is provided with a filter head, and a second end of the trickling filter tube is provided with a plug.

* * * * *